K. SCHEUERMANN.
DRAINAGE PLANT FOR ROAD BEDS.
APPLICATION FILED APR. 8, 1914.
1,108,852.
Patented Aug. 25, 1914.
4 SHEETS—SHEET 1.
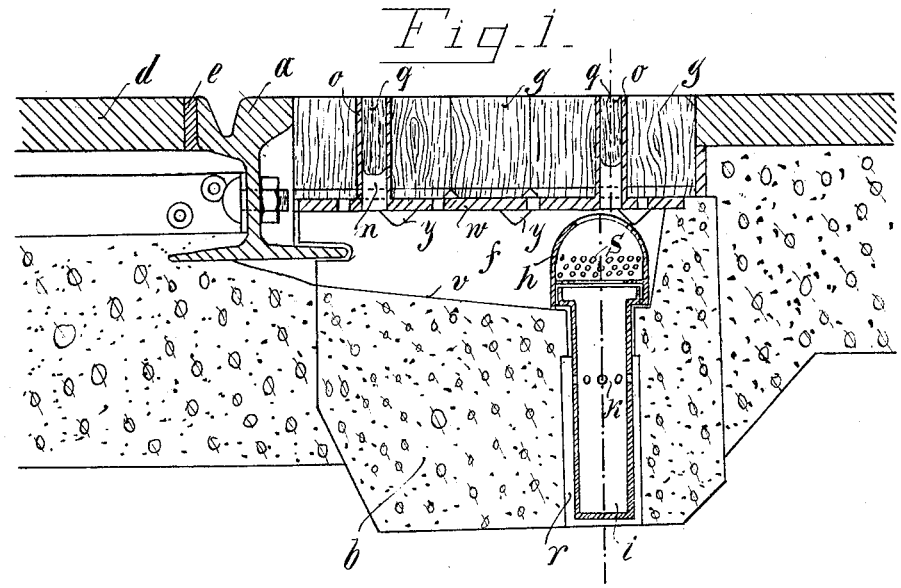
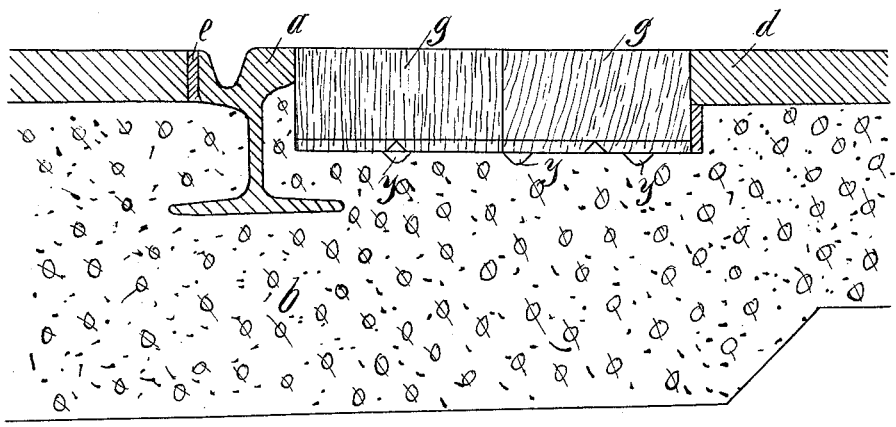
Witnesses:
B. W. Dommers
E. Leckert
Inventor
Karl Scheuermann,
By Henry Orth
atty.

K. SCHEUERMANN.
DRAINAGE PLANT FOR ROAD BEDS.
APPLICATION FILED APR. 8, 1914.

1,108,852.

Patented Aug. 25, 1914.

4 SHEETS—SHEET 2.

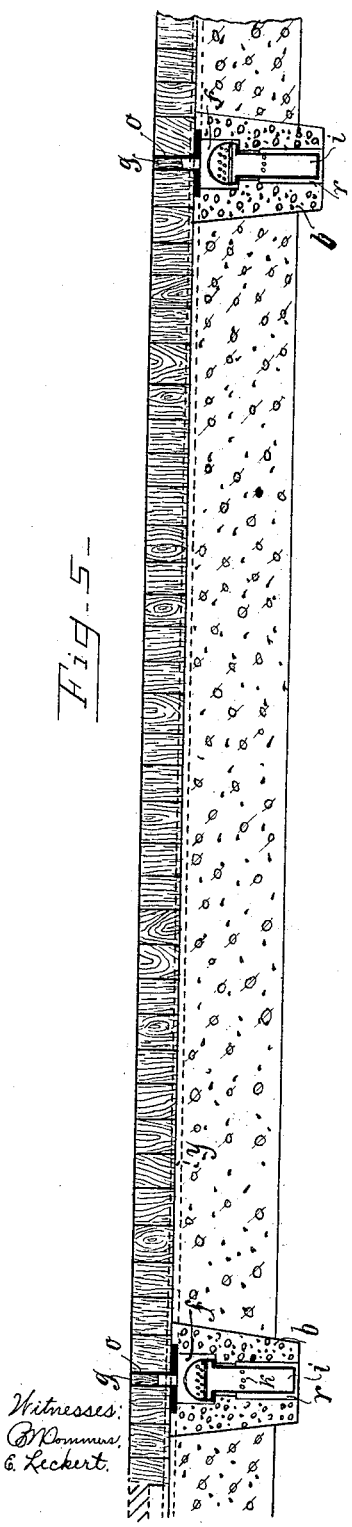
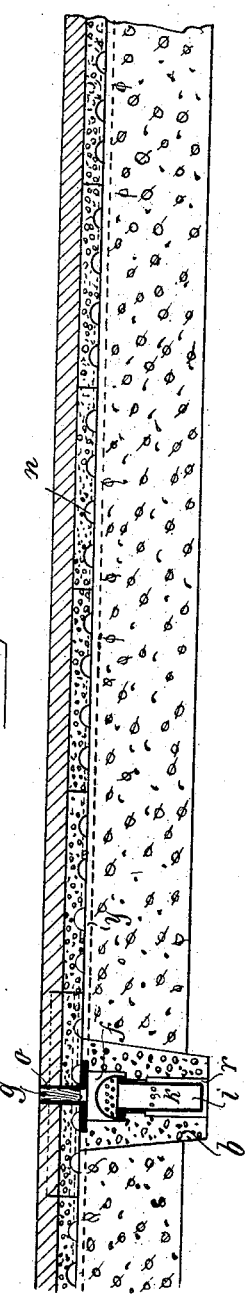
Fig. 5.
Fig. 6.

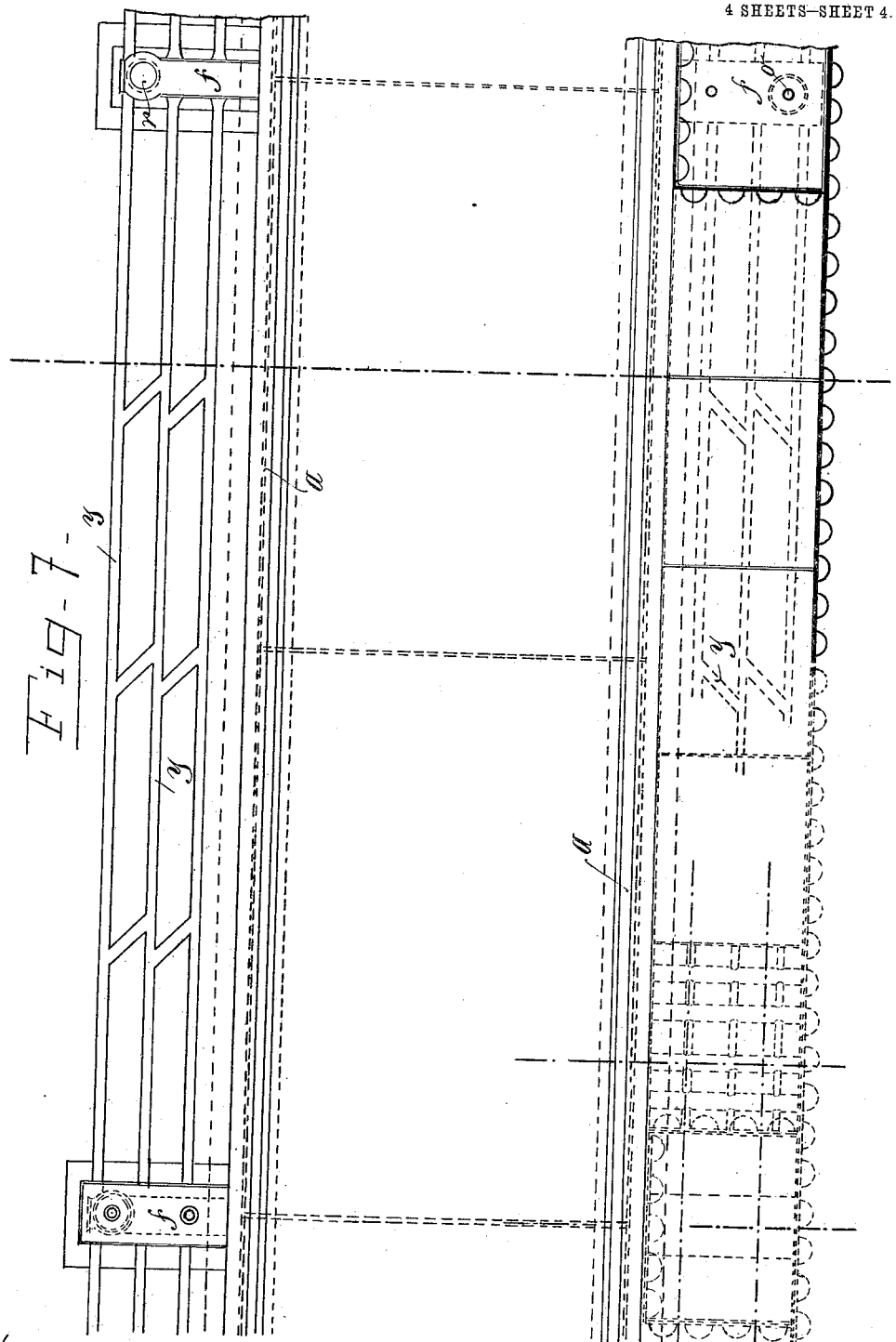

UNITED STATES PATENT OFFICE.

KARL SCHEUERMANN, OF WIESBADEN, GERMANY.

DRAINAGE PLANT FOR ROAD-BEDS.

1,108,852.

Specification of Letters Patent. Patented Aug. 25, 1914.

Application filed April 8, 1914. Serial No. 830,362.

*To all whom it may concern:*

Be it known that I, KARL SCHEUERMANN, a subject of the King of Prussia, German Emperor, residing at the city of Wiesbaden, in the Kingdom of Prussia, Germany, have invented certain new and useful Improvements in Drainage Plants for Road-Beds, of which the following is a specification.

My invention relates to a drainage plant for roadbeds containing tramlines.

It has been proposed to construct roadbeds containing tramlines, so as to quickly conduct the water off through passages beneath the paving, in order to keep the rails and their bedding as dry as possible and to protect them against destruction by remaining water. The known drainage plants for carrying off the water under the roadbed were not readily accessible and would easily become choked. The water had either to be conducted through very long conduits from the neighboring soil, or the latter very soon became non-absorbent in consequence of the impurities of the water. The surrounding of the rails had to be frequently torn up for removing such chokings. For avoiding these difficulties the new plant is so arranged, that the waste and dirty water to be carried off is clarified along its whole course and that these clarifying arrangements are accessible along their whole length. This affords the essential advantage that the water enters the adjoining soil in a perfectly clarified condition, and that all choking and sanding of the soil is out of question. A further advantage is that by the constant control and cleaning of the clarifying arrangements these may always be kept in their original condition. Furthermore the bedding carrying the rails is preserved and the transection of the roadbed by pipes and the like is avoided. Lastly the noise produced by the traveling of the car is considerably reduced by the new arrangement.

The invention consists in constructing a drainage plant for roadbeds containing tramway lines, by providing on the outsides of the rails beneath the surface of the paving a series of hollow spaces which may be opened and in which the street waters run to the sides, and ooze away in a clarified condition after the solid parts have settled in removable setting boxes.

Figure 3:
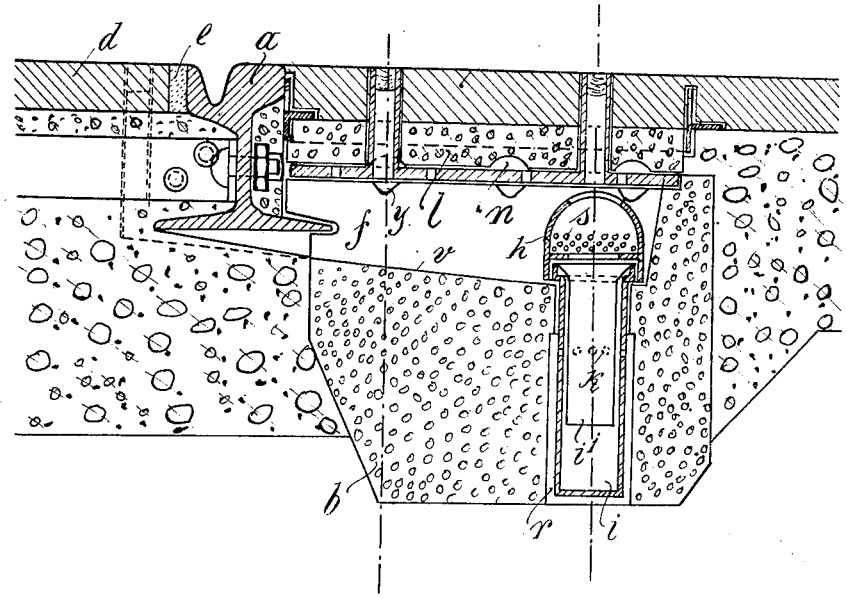
Figure 4:
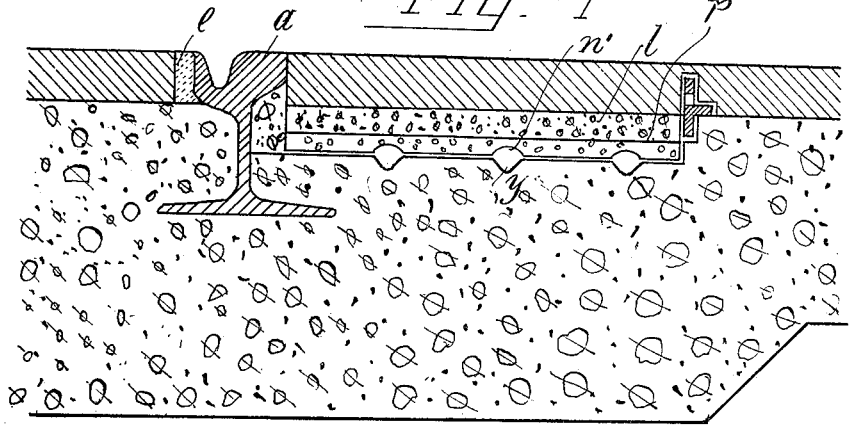

In the accompanying drawings Figure 1 is the cross section through the track, bedding and one of the chambers. Fig. 2 is a cross section through the track and the bedding at a point between two such chambers. Fig. 3 is a cross section through the new plant, asphalt slabs being used between two hollow chambers. Fig. 4 is a section between the two small canals. Fig. 5 is a longitudinal section parallel to the rail and Fig. 6 is a longitudinal section through the plant according to Fig. 3. Fig. 7 is a top view of the whole plant.

$a$ are the rails, which are bedded on the concrete bedding $b$. On the outside of each rail the concrete is made alternately in the form of troughs and chambers, a trough always following a chamber. The troughs have grooves $y$, $y$ and the chambers have inclined bottoms $v$, $v$ and are perforated in a checker-style.

The water flows from the street directly into the chambers $f$, which are connected by the grooves $y$. In the chambers it flows along the bottom $v$, is dammed up at the caps $h$ of the clarifying pot $i$, and is here for the first time intensively clarified. It then falls into the clarifying pot $i$, when it is again clarified and passed as cleaned water from the clarifying pots into the surrounding soil by which it is absorbed. The deeper chambers $f$ are covered at the level of the troughs by perforated plates $w$ on which plates $w$ wooden plugs $g$ are fitted, which are beveled at their foot so that also here a system of hollow spaces is produced, which serves, together with the grooves $y$ to assist the water in running off. The plugs $g$ are bored at $n$, and through these bores pipes $o$ are passed, which are connected to the cover plates $w$ of the chambers. In the pipes $o$ are pieces of wood $q$.

$e$ is a jointing layer for forming a close joint on the inner side of the rail. It consists of an elastic, softer kind of asphalt and is sufficient as a protection against the water penetrating inwardly.

$d$ is the cover of the road which consists of asphalt or the like.

In the shafts $r$ of the chambers $f$ are arranged the clarifying pots $i$ formed with overflow holes $K$ arranged at the middle of their height and with caps $h$ with the entrance holes $s$.

With the new plant all water, which comes into the range of the rails, flows toward the chambers $f$, which is chiefly the object of the system of grooves $y$. In the chambers *f* the water will dam up and thereby the solid particles contained in it will settle from the liquid, and the thus preliminarily clarified water passes through the holes *s, s* into the clarifying pots *i*, rises in these and emerges through the holes K into the surrounding soil through the shafts as clarified water. Through the pipes *o* probes may be introduced for ascertaining the amount of mud which has been deposited, and from time to time the chambers *f* may be opened by removing the plugs *g* and the cover plates *w*. Then the whole course of the water is accessible, the bottoms *v* of the chambers may be cleared of mud and the clarifying pots may be removed and cleaned. The whole plant is thus kept in its original condition.

In the arrangement as shown in Figs. 3 and 4 asphalt plates are employed in place of the wooden plugs *g*. Here concrete slabs *l* having grooves *n'* are laid on the cover plates *w* and over these concrete slabs the asphalt plates are laid.

The slabs *l* are bordered by the steel plates *p*. The clarifying pots are composed of three parts, namely the pot proper *i*, the inset *i'* and the cap or hood *h* with its admission holes *s*.

I claim:

1. In a drainage plant for road-beds containing tracks, the combination of chambers having inclined bottoms and removable covers on the outside of the rails and arranged beneath the surface of the road, and troughs in the bedding of the road on the outside of the rails, and opening into the said chambers.

2. In drainage plants for road-beds containing tracks, the combination of chambers having inclined bottoms, clarifying pots at the outer ends of said chambers and having their inlets above said inclined bottoms, and troughs in the concrete bedding having grooved passages lead to the chambers.

3. In drainage plants for road-beds containing tracks, the combination of chambers beneath the road-bed, removable clarifying pots in the chambers and provided with outlet holes in the middle of their side walls, and caps on said pots having inlet openings situated above the bottoms of the said chambers.

4. In drainage plants for road-beds containing tracks, the combination of chambers having removable cover plates beneath the road-bed, a removable wood paving supported by said plates, and troughs formed with grooves leading to the chambers.

5. In drainage plants for road-beds containing tracks, the combination of chambers beneath the road-bed, removable, grooved cover plates over said chambers, asphalt plates carried by said cover plates, and troughs having small passages leading to said chambers.

6. In drainage plants for roadbeds containing tracks, the combination of chambers having removable covers beneath the road-bed, a clarifying device in each chamber comprising a pot having outlet openings in its side walls above its bottom, an inset in said pot, and a cap on the pot having inlet openings above the bottom of the said chambers.

In testimony whereof I have affixed my signature in presence of two witnesses.

KARL SCHEUERMANN.

Witnesses:
 HENRY HASPER,
 WOLDEMAR HAUPT.